United States Patent
Li et al.

(10) Patent No.: US 10,568,145 B2
(45) Date of Patent: Feb. 18, 2020

(54) RESOURCE ALLOCATION METHOD, DEVICE AND BASE STATION

(71) Applicant: Yulong Computer Telecommunication Scientific (Shenzhen) Co., Ltd., Guangdong (CN)

(72) Inventors: Mingju Li, Guangdong (CN); Yajun Zhu, Guangdong (CN); Yunfei Zhang, Guangdong (CN)

(73) Assignee: Yulong Computer Telecommunication Scientific (Shenzhen) Co., Ltd., Shenzhen (CN)

( * ) Notice: Subject to any disclaimer, the term of this patent is extended or adjusted under 35 U.S.C. 154(b) by 28 days.

(21) Appl. No.: 16/068,344

(22) PCT Filed: Jul. 30, 2016

(86) PCT No.: PCT/CN2016/092470
§ 371 (c)(1),
(2) Date: Jul. 5, 2018

(87) PCT Pub. No.: WO2017/117991
PCT Pub. Date: Jul. 13, 2017

(65) Prior Publication Data
US 2019/0029050 A1    Jan. 24, 2019

(30) Foreign Application Priority Data
Jan. 8, 2016   (CN) .......................... 2016 1 0014057

(51) Int. Cl.
*H04W 74/08* (2009.01)
*H04W 16/14* (2009.01)
(Continued)

(52) U.S. Cl.
CPC ....... *H04W 74/0833* (2013.01); *H04L 5/1469* (2013.01); *H04W 16/14* (2013.01);
(Continued)

(58) Field of Classification Search
CPC .............. H04W 16/14; H04W 72/042; H04W 72/0446; H04W 74/006; H04W 74/0833; H04W 76/27
See application file for complete search history.

(56) References Cited

U.S. PATENT DOCUMENTS 9,433,019 B2 *  8/2016  Li ....................... H04W 74/006
9,439,223 B2 *  9/2016  Li ....................... H04W 74/006
(Continued)

FOREIGN PATENT DOCUMENTS

CN    102271418 A    12/2011
CN    105682232 A    6/2016

OTHER PUBLICATIONS

International Search Report for International Application No. PCT/CN2016/092470 dated Oct. 24, 2016.

*Primary Examiner* — Ahmed Elallam
(74) *Attorney, Agent, or Firm* — Wolf, Greenfield & Sacks, P.C.

(57) ABSTRACT

A resource allocation method, device and base station for when an LTE system in an unlicensed frequency band is running in TDD mode a dynamic uplink-downlink configuration, wherein, the method comprises: transmitting to a terminal indication information used to indicate a time-frequency resource occupied by a physical random access channel (PRACH), so as to enable the terminal to initiate a random access process via a corresponding time-frequency resource, wherein the indication information, when indicating a time-domain frequency occupied by the PRACH, only indicates the position of the first subframe occupied by the PRACH, and the first subframe is an uplink subframe or uplink pilot timeslot (UpPTS).

20 Claims, 1 Drawing Sheet

(51) Int. Cl.
*H04W 72/04* (2009.01)
*H04W 76/27* (2018.01)
*H04L 5/14* (2006.01)

(52) U.S. Cl.
CPC ..... *H04W 72/042* (2013.01); *H04W 72/0446* (2013.01); *H04W 76/27* (2018.02)

(56) References Cited

U.S. PATENT DOCUMENTS

| | | | |
|---|---|---|---|
| 9,814,093 B2* | 11/2017 | Um | H04L 5/0048 |
| 2015/0016361 A1 | 1/2015 | Kim et al. | |
| 2015/0201431 A1* | 7/2015 | Um | H04L 5/0048 |
| | | | 370/280 |
| 2019/0029054 A1* | 1/2019 | Li | H04W 74/08 |
| 2019/0044670 A1* | 2/2019 | Li | H04W 76/11 |

* cited by examiner

RESOURCE ALLOCATION METHOD, DEVICE AND BASE STATION

CROSS-REFERENCES TO RELATED APPLICATIONS

This application is a national stage filing under 35 U.S.C. § 371 of international application No. PCT/CN2016/092470, filed Jul. 30, 2016, entitled "RESOURCE ALLOCATION METHOD, DEVICE AND BASE STATION", which claims priority to Chinese Patent Application No. 201610014057.6, filed on Jan. 8, 2016 and entitled "RESOURCE ALLOCATION METHOD, RESOURCE ALLOCATION DEVICE AND BASE STATION", the disclosures of which are herein incorporated by reference in their entirety.

TECHNICAL FIELD

The present disclosure relates to the field of communication technologies, and relates to, for example, a resource configuration method, device, and base station.

BACKGROUND

At present, a 3rd Generation Partnership Project (3GPP) proposes a concept of LTE Assisted Access (LAA) to use unlicensed spectrum with help of Long Term Evolution (LTE) licensed spectrum. When using unlicensed frequency bands, LTE networks need to ensure that an LAA system can coexist with related access technologies such as Wi-Fi access technologies on a fair and friendly basis. However, in a traditional LTE system, there is no Listen Before Talk (LBT) mechanism to avoid collision. In order to coexist with Wi-Fi, the LTE system needs an LBT mechanism. In this way, if LTE detects that a channel is busy on the unlicensed spectrum, the frequency band thereof cannot be occupied. If it is detected that the channel is idle, the frequency band can be occupied.

Traditionally, in a Physical Random Access Channel (PRACH) resource configuration of Time Division Duplexing (TDD), there are five formats of random access preamble sequences.

When the unlicensed spectrum is used in a TDD mode, an uplink/downlink configuration of a traditional TDD is fixed, such as seven kinds of fixed subframe allocation modes in the related art, so that ratio of uplink/downlink time slots is lack of flexibility.

In order to better adapt to dynamic changes of uplink/downlink services and the LBT mechanism, for example, when data is transmitted through a Physical Downlink Shared Channel (PDSCH), maximum channel occupation time of downlink may be 8 ms or 10 ms, but if a conversion from a downlink subframe to an uplink subframe is performed during this time period, an LBT channel detection must be performed again, so that the channel is taken away by other systems, such as a Wi-Fi system. In the related art, it is proposed a fully dynamic uplink/downlink subframe configuration, i.e., each subframe can be changed to an uplink subframe or a downlink subframe at any time.

However, there may be only one uplink subframe or Uplink Pilot Timeslot (UpPTS) within a frame of 10 ms, or there may even be no uplink subframe or UpPTS. In this way, it urgently needs to solve a technical problem on how to properly configure time-frequency resources occupied by the PRACH.

SUMMARY

The present disclosure proposes a resource configuration scheme, which can reasonably configure time-frequency resources occupied by a PRACH, so as to ensure that an LTE system can achieve more random accesses in a case of fewer uplink subframes when operating on an unlicensed frequency band in a TDD mode with a dynamic uplink/downlink mode.

In view of this, according to a first aspect of the present disclosure, it provides a resource configuration method, which includes:

transmitting, to a terminal, indication information used to indicate the time-frequency resources occupied by the PRACH, wherein the method is applied to a case where the LTE system operates on the unlicensed frequency band in the TDD mode with the dynamic uplink/downlink configuration, wherein the indication information indicates a position of a first subframe occupied by the PRACH, and the first subframe is an uplink subframe or an UpPTS.

In this technical solution, since the LTE system operates on the unlicensed frequency band in the TDD mode with the dynamic uplink/downlink mode, each subframe may be changed to an uplink subframe or a downlink subframe at any time. Therefore, the present disclosure proposes a scheme in which the base station transmits indication information to the terminal to indicate the time-frequency resources occupied by the PRACH through the indication information, and to indicate only the position of the first subframe, for example, the uplink subframe or the UpPTS, occupied by the PRACH through the indication information.

The terminal initiates a random access process according to the time-frequency resources in the indication information. In the process of initiating the random access, the terminal may determine a time length of an occupied channel according to the used format of a random access preamble sequence, so as to reasonably configure the time-frequency resources occupied by the PRACH, and enable the LTE system to achieve more random accesses in a case of fewer uplink subframes or UpPTSs when operating on the unlicensed frequency band in the TDD mode with the dynamic uplink/downlink mode.

In the foregoing technical solution, optionally, transmitting to the terminal the indication information used to indicate the time-frequency resources occupied by the PRACH includes:

transmitting, to the terminal through a Radio Resource Control (RRC) signaling, indication information used to indicate frequency domain resources occupied by the PRACH, and transmitting, to the terminal through a downlink control information (DCI) signaling, indication information used to indicate time domain resources occupied by the PRACH; or transmitting, to the terminal through the DCI signaling, indication information used to indicate the time domain resources and the frequency domain resources occupied by the PRACH.

In the foregoing technical solution, optionally, transmitting to the terminal through the DCI signaling the indication information used to indicate the time domain resources occupied by the PRACH includes:

transmitting, to the terminal through a first DCI signaling, information used to indicate all the uplink subframes and/or the UpPTSs within a predetermined time domain range; and transmitting, to the terminal through a second DCI signaling, information used to indicate a position of the first subframe occupied by the PRACH in the all the uplink subframes and/or the UpPTSs.

In any of the foregoing technical solutions, optionally, the step of transmitting to the terminal the indication information used to indicate time-frequency resources occupied by the PRACH includes:

transmitting, to the terminal in a downlink subframe n, the indication information to indicate to the terminal that a subframe n+m is the first subframe occupied by the PRACH, wherein m is a positive integer less than or equal to 10; and the resource configuration method further includes: determining the number of bits occupied by the indication information according to value of m. Exemplarily, if m=10, the number of bits occupied by the indication information is 4; if m=8, the number of bits occupied by the indication information is 3.

In any of the foregoing technical solutions, optionally, the method further includes: transmitting again, if the indication information is transmitted to the terminal in the downlink subframe n, the indication information to the terminal in each downlink subframe after the downlink subframe n and before the subframe n+m.

In this technical solution, the indication information is transmitted to the terminal again in each downlink subframe after the downlink subframe n and before the subframe n+m, thereby effectively ensuring the indication information transmitted by the base station can be received by the terminal.

In any of the foregoing technical solutions, optionally, the indication information is transmitted to the terminal on a licensed frequency band or the unlicensed frequency band.

In any of the foregoing technical solutions, optionally, the indication information is transmitted to all the terminals at one time by using the DCI signaling in a common search space, or the indication information is transmitted at one time to only one specified terminal by using the DCI signaling of a UE-specific search space.

In any of the foregoing technical solutions, optionally, the method further includes: a format is selected from a set of the formats of the random access preamble sequences, and the selected format of the random access preamble sequence is configured to the terminal.

Optionally, the set of the formats of the random access preamble sequences satisfies the following conditions:

containing one format, which is a format 0 or a format 4 of the random access preamble sequence;

containing two formats, which are the format 0 and the format 4 of the random access preamble sequence;

containing three formats, which are: the format 0, the format 4 and a format 1 of the random access preamble sequence, or the format 0, the format 4 and a format 2 of the random access preamble sequence;

containing four formats, which are the format 0, the format 4, the format 1 and the format 2 of the random access preamble sequence; or containing five formats, which are the format 0, the format 4, the format 1, the format 2 and a format 3 of the random access preamble sequence.

Exemplarily, as for the five formats of the random access preamble sequences, the size relationship thereof with respect to time lengths during which random channels are occupied by the terminal is: format 4<format 0<format 1=format 2<format 3. It can be seen that in the format 4 of the random access preamble sequence, the time length during which the random access channel is occupied by the terminal is shortest. Therefore, to ensure fairness of occupying the channels in different formats, a channel detection mode corresponding to the format 4 has the highest priority, followed by a channel detection mode corresponding to the format 0, and followed by channel detection modes corresponding to the format 1 and the format 2, and followed by a channel detection mode corresponding to the format 3. Therefore, according to an order of priorities of the signal detection modes, when an LAA system configures the set of the formats of the random access preamble sequences, if only one format is used, the format 0 or the format 4 may be selected; if two formats are used, the format 0 and the format 4 may be selected; if three formats are used, the format 0, the format 4 and the format 1, or the format 0, the format 4 and the format 2 may be selected; if four formats are used, the format 0, the format 4, the format 1 and the format 2 may be selected; if five formats are used, the format 0, the format 4, the format 1, the format 2 and the format 3 may be selected. In this way, the LAA system can configure one format of the random access preamble sequence to the terminal according to the configured set of the formats of the random access preamble sequences.

In any of the foregoing technical solutions, optionally, six frequency domain resource blocks are configured in any one of the uplink subframes or the UpPTS. Compared with configuring a maximum of six frequency domain resource blocks of the PRACH in a 10 ms subframe in the related art, the technical solution configures six frequency domain resource blocks in each uplink subframe or UpPTS so that the terminal can perform random access in each uplink subframe or UpPTS.

In any of the foregoing technical solutions, optionally, six frequency domain resource blocks occupied by each of the PRACHs are evenly and discontinuously distributed over a bandwidth of the LTE system; or the six frequency domain resource blocks occupied by each of the PRACHs are continuously distributed over a bandwidth of the LTE system.

According to a second aspect of the present disclosure, it further provides a resource configuration device, which includes:

a transmitting unit, configured to transmit indication information used to indicate time-frequency resources occupied by a PRACH to a terminal, so as to enable the terminal to initiate a random access process through corresponding time-frequency resources, wherein the device is applied to a case where an LTE system operates on an unlicensed frequency band in a TDD mode with a dynamic uplink/downlink configuration, and the indication information, when indicating time domain resources occupied by the PRACH, indicates only a position of a first subframe occupied by the PRACH, wherein the first subframe is an uplink subframe or an UpPTS.

In this technical solution, since the LTE system operates on the unlicensed frequency band in the TDD mode with the dynamic uplink/downlink mode, each subframe may be changed to an uplink subframe or a downlink subframe at any time. Therefore, the present disclosure proposes a scheme of transmitting, by the base station, indication information to the terminal to indicate the time-frequency resources occupied by the PRACH through the indication information, and to indicate only the position of the first subframe (an uplink subframe or an UpPTS) occupied by the PRACH through the indication information.

The terminal initiates the random access process according to the time-frequency resources in the indication information. In the random access process, the terminal may determine the time length of the occupied channel according to the used format of the random access preamble sequence, so as to reasonably configure the time-frequency resources occupied by the PRACH, and enable the LTE system to achieve more random accesses in the case of fewer uplink subframes or UpPTSs when operating on the unlicensed frequency band in the TDD mode with the dynamic uplink/downlink mode.

In the foregoing technical solution, optionally, the transmitting unit is configured to: transmitting, to the terminal through a Radio Resource Control (RRC) signaling, indication information used to indicate frequency domain resources occupied by the PRACH, and transmitting, to the terminal through a downlink control information (DCI) signaling, indication information used to indicate the time domain resources occupied by the PRACH; or transmitting, to the terminal through the DCI signaling, indication information used to indicate the time domain resources and the frequency domain resources occupied by the PRACH.

In the foregoing technical solution, optionally, transmitting to the terminal through DCI signaling the indication information used to indicate the time domain resources occupied by the PRACH includes: transmitting, to the terminal through a first DCI signaling, information used to indicate all the uplink subframes and/or the UpPTSs within a predetermined time domain range; and transmitting, to the terminal through a second DCI signaling, information used to indicate a position of the first subframe occupied by the PRACH in the all the uplink subframes and/or the UpPTSs.

In any of the foregoing technical solutions, optionally, the transmitting unit is configured to: transmitting, to the terminal in a downlink subframe n, the indication information to indicate to the terminal that a subframe n+m is the first subframe occupied by the PRACH, wherein m is a positive integer less than or equal to 10; and the resource configuration device further includes: a determining unit, configured to determine the number of bits occupied by the indication information according to value of m. Exemplarily, if m=10, the number of bits occupied by the indication information is four; and if m=8, the number of bits occupied by the indication information is three.

In any of the foregoing technical solutions, optionally, the transmitting unit is configured to: transmitting again, if the indication information is transmitted to the terminal in the downlink subframe n, the indication information to the terminal in each downlink subframe after the downlink subframe n and before the subframe n+m.

In this technical solution, the indication information is transmitted to the terminal again in each downlink subframe after the downlink subframe n and before the subframe n+m, thereby effectively ensuring the indication information transmitted by the base station can be received by the terminal.

In any of the foregoing technical solutions, optionally, the transmitting unit is configured to: transmitting, to the terminal, the indication information on a licensed frequency band or the unlicensed frequency band.

In any of the foregoing technical solutions, optionally, the transmitting unit is configured to: transmitting, to all the terminals, the indication information at one time by using the DCI signaling in a common search space, or transmitting, to only one specified terminal, the indication information at one time by using the DCI signaling of a UE-specific search space.

In any of the foregoing technical solutions, optionally, the device further includes: an configuration unit, configured to configure a format of a random access preamble sequence to the terminal, wherein, when configuring the format of the random access preamble sequence to the terminal, the configuration unit selects a format from a set of the formats of the random access preamble sequences, and configures the selected format of the random access preamble sequence to the terminal.

Optionally, the set of the formats of the random access preamble sequences satisfies the following condition:

containing one format, which is a format 0 or a format 4 of the random access preamble sequence;

containing two formats, which are the format 0 and the format 4 of the random access preamble sequence;

containing three formats, which are: the format 0, the format 4 and a format 1 of the random access preamble sequence, or the format 0, the format 4 and a format 2 of the random access preamble sequence;

containing four formats, which are the format 0, the format 4, the format 1 and the format 2 of the random access preamble sequence; or containing five formats, which are the format 0, the format 4, the format 1, the format 2 and a format 3 of the random access preamble sequence.

Optionally, as for the five formats of the random access preamble sequences, the size relationship thereof with respect to time lengths during which random channels are occupied by the terminal is: format 4<format 0<format 1=format 2<format 3. It can be seen that in the format 4 of the random access preamble sequence, the time length during which the random access channel is occupied by the terminal is shortest. Therefore, to ensure fairness of occupying the channels in different formats, a channel detection mode corresponding to the format 4 has the highest priority, followed by a channel detection mode corresponding to the format 0, and followed by channel detection modes corresponding to the format 1 and the format 2, and followed by a channel detection mode corresponding to the format 3. Therefore, according to an order of priorities of the signal detection modes, when an LAA system configures the set of the formats of the random access preamble sequences, if only one format is used, the format 0 or the format 4 may be selected; if two formats are used, the format 0 and the format 4 may be selected; if three formats are used, the format 0, the format 4 and the format 1, or the format 0, the format 4 and the format 2 may be selected; if four formats are used, the format 0, the format 4, the format 1 and the format 2 may be selected; if five formats are used, the format 0, the format 4, the format 1, the format 2 and the format 3 may be selected. In this way, the LAA system can configure one format of the random access preamble sequence to the terminal according to the configured set of the formats of the random access preamble sequences.

In any of the foregoing technical solutions, optionally, six frequency domain resource blocks are configured in any one of the uplink subframes or the UpPTS. Compared with configuring a maximum of six frequency domain resource blocks of the PRACH in a 10 ms subframe in the related art, the technical solution configures six frequency domain resource blocks in each uplink subframe or UpPTS so that the terminal can perform random access in each uplink subframe or UpPTS.

In any of the foregoing technical solutions, optionally, six frequency domain resource blocks occupied by each of the PRACHs are evenly and discontinuously distributed over a bandwidth of the LTE system; or the six frequency domain resource blocks occupied by each of the PRACHs are continuously distributed over a bandwidth of the LTE system.

According to a third aspect of the present disclosure, it further provides a base station, which includes: a resource configuration device when an LTE system operates on an unlicensed frequency band in a TDD mode with a dynamic uplink/downlink mode described in any one of the foregoing technical solutions.

According to a fourth aspect of the present disclosure, there is also provided a non-transitory computer-readable storage medium storing computer-executable instructions for performing any one of the resource configuration methods in the above method embodiments.

Through the foregoing technical solutions, the time-frequency resources occupied by the PRACH can be reasonably configured, so as to ensure that the LTE system can achieve more random accesses in the case of fewer uplink subframes when operating on the unlicensed frequency band in the TDD mode with the dynamic uplink/downlink mode.

DETAILED DESCRIPTION

For a more clear understanding of above-mentioned objects, features, and advantages of the present disclosure, the present disclosure will be described below in conjunction with the accompanying drawings and optional embodiments. It should be noted that the embodiments of the present disclosure and the features in the embodiments can be combined with each other without conflict.

Details are set forth in the following description in order to provide a thorough understanding of the present disclosure. However, the present disclosure may also be implemented in other ways different from those described herein. Therefore, a scope of protection of the present disclosure is not limited by alternative embodiments disclosed below.

Figure 1:
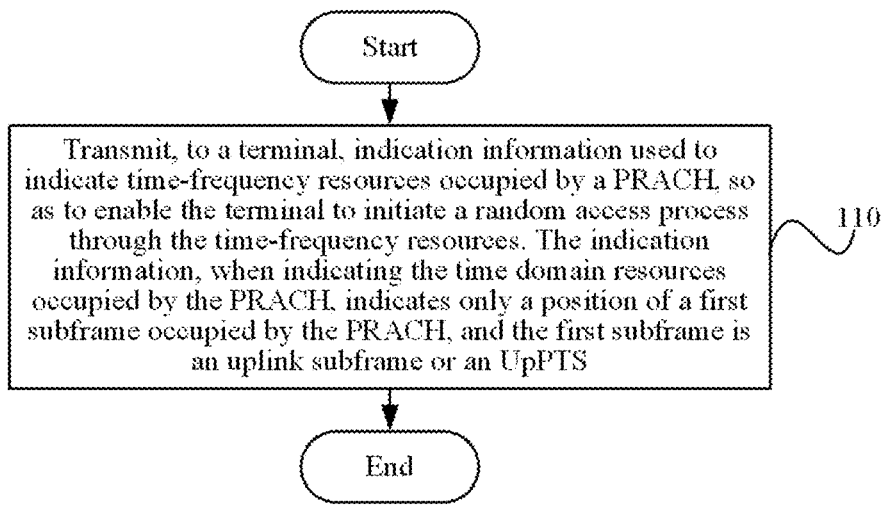
FIG. 1 shows a schematic flow chart of a resource configuration method according to an embodiment of the present disclosure.

FIG. 1 shows a schematic flow chart of a resource configuration method according to an embodiment of the present disclosure.

As shown in FIG. 1, a resource configuration method in a case where an LTE system operates on an unlicensed frequency band in a TDD mode with a dynamic uplink/downlink mode according to an embodiment of the present disclosure includes:

In step 110, a base station transmits indication information used to indicate time-frequency resources occupied by a PRACH to a terminal, so as to enable the terminal to initiate a random access process through the time-frequency resources in the indication information. The method is applied to a case where the LTE system operates on the unlicensed frequency band in the TDD mode with the dynamic uplink/downlink mode, and the indication information, when indicating the time domain resources occupied by the PRACH, indicates only a position of a first subframe occupied by the PRACH, and the first subframe is an uplink subframe or an UpPTS.

In this technical solution, since the LTE system operates on the unlicensed frequency band in the TDD mode with the dynamic uplink/downlink mode, each subframe may be changed to an uplink subframe or a downlink subframe at any time. Therefore, the present disclosure proposes a scheme of transmitting by the base station indication information to the terminal to indicate the time-frequency resources occupied by the PRACH through the indication information, and to indicate only the position of the first subframe, for example, the uplink subframe or the UpPTS, occupied by the PRACH through the indication information.

The terminal initiates the random access process according to the time-frequency resources in the indication information. In the process of initiating the random access, the terminal may determine a time length of an occupied channel according to the used format of a random access preamble sequence, so as to reasonably configure the time-frequency resources occupied by the PRACH, and enable the LTE system to achieve more random accesses in a case of fewer uplink subframes or UpPTSs when operating on the unlicensed frequency band in the TDD mode with the dynamic uplink/downlink mode.

In the foregoing technical solution, optionally, transmitting by the base station to the terminal the indication information used to indicate the time-frequency resources occupied by the PRACH may include the steps in which indication information used to indicate frequency domain resources occupied by the PRACH is transmitted by the base station to the terminal through a RRC signaling, and indication information used to indicate the time domain resources occupied by the PRACH is transmitted by the base station to the terminal through a DCI signaling; or indication information used to indicate the time domain resources and the frequency domain resources occupied by the PRACH is transmitted by the base station to the terminal through the DCI signaling.

In the foregoing technical solution, optionally, transmitting to the terminal through the DCI signaling the indication information used to indicate the time domain resources occupied by the PRACH may include steps in which information used to indicate all the uplink subframes and/or the UpPTSs within a predetermined time domain range is transmitted by the base station to the terminal through a first DCI signaling; and information used to indicate a position of the first subframe occupied by the PRACH in the all the uplink subframes and/or the UpPTSs is transmitted by the base station to the terminal through a second DCI signaling.

In any of the foregoing technical solutions, optionally, transmitting by the base station to the terminal the indication information used to indicate the time-frequency resources occupied by the PRACH may include a step in which in a downlink subframe n, the indication information is transmitted by the base station to the terminal, so as to indicate to the terminal that a subframe n+m is the first subframe occupied by the PRACH, and m is a positive integer less than or equal to 10.

The resource configuration method further includes steps in which the number of bits occupied by the indication information is determined according to value of m. Exemplarily, if m=10, the number of bits occupied by the indication information is four; and if m=8, the number of bits occupied by the indication information is three.

In any of the foregoing technical solutions, optionally, the method further includes steps in which if the indication information is transmitted by the base station to the terminal in the downlink subframe n, the indication information is transmitted again by the base station to the terminal, in each downlink subframe after the downlink subframe n and before the subframe n+m.

In this technical solution, the indication information is transmitted again by the base station to the terminal, in each downlink subframe after the downlink subframe n and before the subframe n+m, thereby effectively ensuring that the indication information transmitted by the base station can be received by the terminal.

In any of the foregoing technical solutions, optionally, the method further includes a step in which the indication information is transmitted by the base station to the terminal on a licensed frequency band or the unlicensed frequency band.

In any of the foregoing technical solutions, optionally, the method further includes a step in which the indication information is transmitted by the base station to all the terminals at one time by using the DCI signaling in a common search space, or the indication information is transmitted by the base station at one time to only one specified terminal by using the DCI signaling of a UE-specific search space.

In any of the foregoing technical solutions, optionally, the method further includes a step in which a format of a random access preamble sequence is configured by the base station to the terminal. When the format of the random access preamble sequence is configured by the base station to the terminal, a format is selected from a set of the formats of the random access preamble sequences, and the selected format of the random access preamble sequence is configured to the terminal.

Traditionally, in a PRACH resource configuration of TDD, there are five formats of random access preamble sequences:

(1) format 0: occupies 1 ms;
(2) format 1: occupies 2 ms;
(3) format 2: occupies 2 ms;
(4) format 3: occupies 3 ms;
(5) format 4: occupies less than 1 ms and only occupies the UpPTS.

As shown in Table 1, $T_{CP}$ represents a time length of the cyclic prefix in the sequence, $T_{SEQ}$ represents the time length of the sequence, and Ts represents a time length per unit.

Detailed information of the above five formats is shown in Table 1:

TABLE 1

| Formats of Random Access Preamble Sequences | $T_{CP}$ | $T_{SEQ}$ |
|---|---|---|
| 0 | $3168 \cdot T_s$ | $24576 \cdot T_s$ |
| 1 | $21024 \cdot T_s$ | $24576 \cdot T_s$ |
| 2 | $6240 \cdot T_s$ | $2 \cdot 24576 \cdot T_s$ |
| 3 | $21024 \cdot T_s$ | $2 \cdot 24576 \cdot T_s$ |
| 4 | $448 \cdot T_s$ | $4096 \cdot T_s$ |

Optionally, the set of the formats of the random access preamble sequences satisfies the following conditions:
contains one format, which is a format 0 or a format 4 of the random access preamble sequence;
contains two formats, which are the format 0 and the format 4 of the random access preamble sequence;
contains three formats, which are the: format 0, the format 4 and a format 1 of the random access preamble sequence, or the format 0, the format 4 and a format 2 of the random access preamble sequence;
contains four formats, which are the format 0, the format 4, the format 1 and the format 2 of the random access preamble sequence; or
contains five formats, which are the format 0, the format 4, the format 1, the format 2 and a format 3 of the random access preamble sequence.

Exemplarily, as for the five formats of the random access preamble sequences, the size relationship thereof with respect to time lengths during which random channels are occupied by the terminal is: format 4<format 0<format 1=format 2<format 3. It can be seen that in the format 4 of the random access preamble sequence, the time length during which the random access channel is occupied by the terminal is shortest. Therefore, to ensure fairness of occupying the channels in different formats, a channel detection mode corresponding to the format 4 has the highest priority, followed by a channel detection mode corresponding to the format 0, and followed by channel detection modes corresponding to the format 1 and the format 2, and followed by a channel detection mode corresponding to the format 3. Therefore, according to an order of priorities of the signal detection modes, when an LAA system configures the set of the formats of the random access preamble sequences, if only one format is used, the format 0 or the format 4 may be selected; if two formats are used, the format 0 and the format 4 may be selected; if three formats are used, the format 0, the format 4 and the format 1, or the format 0, the format 4 and the format 2 may be selected; if four formats are used, the format 0, the format 4, the format 1 and the format 2 may be selected; if five formats are used, the format 0, the format 4, the format 1, the format 2 and the format 3 may be selected. In this way, the LAA system can configure one format of the random access preamble sequence to the terminal according to the configured set of the formats of the random access preamble sequences.

In any of the foregoing technical solutions, optionally, six frequency domain resource blocks are configured in any one of the uplink subframes or the UpPTS. Compared with configuring a maximum of six frequency domain resource blocks of the PRACH in a 10 ms subframe in the related art, the technical solution configures six frequency domain resource blocks in each uplink subframe or UpPTS so that the terminal can perform random access in each uplink subframe or UpPTS.

In any of the foregoing technical solutions, optionally, six frequency domain resource blocks occupied by each of the PRACHs are evenly and discontinuously distributed over a bandwidth of the LTE system; or
the six frequency domain resource blocks occupied by each of the PRACHs are continuously distributed over a bandwidth of the LTE system.

Figure 2:
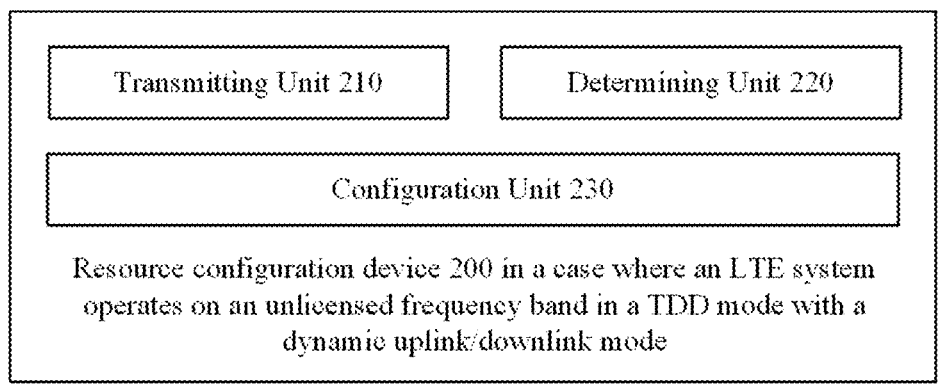
FIG. 2 shows a schematic block diagram of a resource configuration device according to an embodiment of the present disclosure.

FIG. 2 shows a schematic block diagram of a resource configuration device 200 according to an embodiment of the present disclosure.

As shown in FIG. 2, the resource configuration device 200 in a case where an LTE system operates on an unlicensed frequency band in a TDD mode with a dynamic uplink/downlink mode according to an embodiment of the present disclosure includes a transmitting unit 210.

The transmitting unit 210 is configured to transmit indication information used to indicate time-frequency resources occupied by a PRACH to a terminal, so as to enable the terminal to initiate a random access process through corresponding time-frequency resources. The device is applied to a case that the LTE system operates on the unlicensed frequency band in the TDD mode with the dynamic uplink/downlink mode, and when indicating time domain resources occupied by the PRACH, the indication information indicates only a position of a first subframe occupied by the PRACH, and the first subframe is an uplink subframe or an UpPTS.

In this technical solution, since the LTE system operates on the unlicensed frequency band in the TDD mode with the dynamic uplink/downlink mode, each subframe may be changed to an uplink subframe or a downlink subframe at any time. Therefore, the present disclosure proposes a scheme of transmitting by the base station indication information to the terminal to indicate the time-frequency resources occupied by the PRACH through the indication information, and to indicate only the position of the first subframe, for example, the uplink subframe or the UpPTS, occupied by the PRACH through the indication information.

The terminal initiates the random access process according to the time-frequency resources in the indication information. In the random access process, the terminal may determine the time length of the occupied channel according to the used format of the random access preamble sequence, so as to reasonably configure the time-frequency resources occupied by the PRACH, and enable the LTE system to achieve more random accesses in the case of fewer uplink subframes or UpPTSs when operating on the unlicensed frequency band in the TDD mode with the dynamic uplink/downlink mode.

In the foregoing technical solution, optionally, the transmitting unit 210 is configured to: transmit indication information used to indicate frequency domain resources occupied by the PRACH to the terminal through a RRC signaling, and transmit indication information used to indicate the time domain resources occupied by the PRACH to the terminal through a DCI signaling; or transmit indication information used to indicate the time domain resources and the frequency domain resources occupied by the PRACH to the terminal through the DCI signaling.

In the foregoing technical solution, optionally, transmitting to the terminal through DCI signaling the indication information used to indicate the time domain resources occupied by the PRACH includes steps in which information used to indicate all the uplink subframes and/or the UpPTSs within a predetermined time domain range is transmitted to the terminal through a first DCI signaling; and information used to indicate a position of the first subframe occupied by the PRACH in the all the uplink subframes and/or the UpPTSs is transmitted to the terminal through a second DCI signaling.

In any of the foregoing technical solutions, optionally, the transmitting unit 210 is configured to: transmit the indication information to the terminal in a downlink subframe n, so as to indicate to the terminal that a subframe n+m is the first subframe occupied by the PRACH, and m is a positive integer less than or equal to 10.

The resource configuration device further includes a determining unit 220, configured to determine the number of bits occupied by the indication information according to value of m. Exemplarily, if m=10, the number of bits occupied by the indication information is four; and if m=8, the number of bits occupied by the indication information is three.

In any of the foregoing technical solutions, optionally, the transmitting unit 210 is configured to: if the indication information is transmitted to the terminal in the downlink subframe n, the indication information is transmitted to the terminal again in each downlink subframe after the downlink subframe n and before the subframe n+m.

In this technical solution, the indication information is transmitted to the terminal again in each downlink subframe after the downlink subframe n and before the subframe n+m, thereby effectively ensuring that the indication information transmitted by the base station can be received by the terminal.

In any of the foregoing technical solutions, optionally, the transmitting unit 210 is configured to transmit the indication information to the terminal on a licensed frequency band or the unlicensed frequency band.

In any of the foregoing technical solutions, optionally, the transmitting unit 210 is configured to: transmit the indication information to all the terminals at one time by using the DCI signaling in a common search space, or transmit the indication information to only one specified terminal at one time by using the DCI signaling of a UE-specific search space.

In any of the foregoing technical solutions, optionally, the device further includes: an configuration unit 230, configured to configure a format of a random access preamble sequence to the terminal. When the format of the random access preamble sequence is configured by configuration unit 230 to the terminal, a format is selected from a set of the formats of the random access preamble sequences, and the selected format of the random access preamble sequence is configured to the terminal.

Optionally, the set of the formats of the random access preamble sequences satisfies the following conditions:

contains one format, which is a format 0 or a format 4 of the random access preamble sequence;

contains two formats, which are the format 0 and the format 4 of the random access preamble sequence;

contains three formats, which are the: format 0, the format 4 and a format 1 of the random access preamble sequence, or the format 0, the format 4 and a format 2 of the random access preamble sequence;

contains four formats, which are the format 0, the format 4, the format 1 and the format 2 of the random access preamble sequence; or contains five formats, which are the format 0, the format 4, the format 1, the format 2 and a format 3 of the random access preamble sequence.

Exemplarily, as for the five formats of the random access preamble sequences, the size relationship thereof with respect to time lengths during which random channels are occupied by the terminal is: format 4<format 0<format 1=format 2<format 3. It can be seen that in the format 4 of the random access preamble sequence, the time length during which the random access channel is occupied by the terminal is shortest. Therefore, to ensure fairness of occupying the channels in different formats, a channel detection mode corresponding to the format 4 has the highest priority, followed by a channel detection mode corresponding to the format 0, and followed by channel detection modes corresponding to the format 1 and the format 2, and followed by a channel detection mode corresponding to the format 3. Therefore, according to an order of priorities of the signal detection modes, when an LAA system configures the set of the formats of the random access preamble sequences, if only one format is used, the format 0 or the format 4 may be selected; if two formats are used, the format 0 and the format 4 may be selected; if three formats are used, the format 0, the format 4 and the format 1, or the format 0, the format 4 and the format 2 may be selected; if four formats are used, the format 0, the format 4, the format 1 and the format 2 may be selected; if five formats are used, the format 0, the format 4, the format 1, the format 2 and the format 3 may be selected. In this way, the LAA system can configure one format of the random access preamble sequence to the terminal according to the configured set of the formats of the random access preamble sequences.

In any of the foregoing technical solutions, optionally, six frequency domain resource blocks are configured in any one of the uplink subframes or the UpPTS. Compared with configuring a maximum of six frequency domain resource blocks of the PRACH in a 10 ms subframe in the related art, the technical solution configures six frequency domain resource blocks in each uplink subframe or UpPTS so that the terminal can perform random access in each uplink subframe or UpPTS.

In any of the foregoing technical solutions, optionally, six frequency domain resource blocks occupied by each of the PRACHs are evenly and discontinuously distributed over a bandwidth of the LTE system; or the six frequency domain resource blocks occupied by each of the PRACHs are continuously distributed over a bandwidth of the LTE system.

Figure 3:
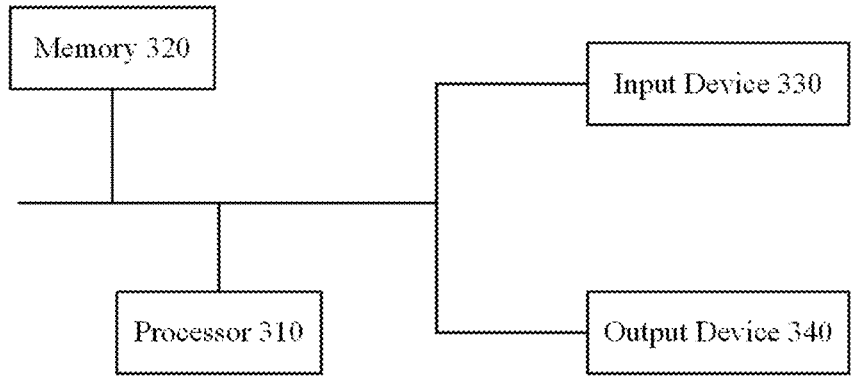
FIG. 3 shows a schematic block diagram of a base station according to an embodiment of the present disclosure.

FIG. 3 shows a schematic block diagram of a base station according to an embodiment of the present disclosure.

As shown in FIG. 3, a base station 300 according to an embodiment of the present disclosure includes: a resource configuration device 200 in a case where the LTE system as shown in FIG. 2 operates on the unlicensed frequency band in the TDD mode with the dynamic uplink/downlink mode.

The base station 300 includes: one or more processors 310, such as the processor 310 as shown in FIG. 3; and a memory 320. The base station may further include an input device 330 and an output device 340.

The processor 310, the memory 320, the input device 330, and the output device 340 in the terminal may be connected through a bus or other ways. In FIG. 3, the connections are made through the bus, for example.

As a non-transitory computer-readable storage medium, the memory 320 may be used to store software programs, computer-executable programs, and modules, such as the program instructions/modules corresponding to the resource configuration methods in the embodiments of the present disclosure (for example, the transmitting unit 210 shown in FIG. 2). The processor 310 executes various functional applications and data processing of a server by executing the software programs, the instructions, and the modules stored in the memory 320, so that the resource configuration methods according to the above method embodiments are implemented.

The memory 320 may include a program storing area and a data storing area. The program storing area can store an operating system, and an application required for at least one function. The storage data area may store data created according to the use of a terminal device, and the like. In addition, the memory 320 may include a high-speed random access memory, and may also include a non-transitory memory, such as at least one disk storage device, a flash memory device, or other non-transitory solid-state storage devices. In some embodiments, the memory 320 optionally includes memories remotely disposed with respect to the processor 310. These remote memories may be connected to the terminal device through a network. An example of such the network includes, but not limited to, Internet, an intranet, a local area network, a mobile communications network, and a combination thereof.

The input device 330 can be used to receive input numerical or character information, and generate key signal inputs related to the user's settings and function control of the terminal. The output device 340 may include a display device such as a display screen.

The one or more modules are stored in the memory 320, and when being executed by the one or more processors 310, any one of the resource configuration methods according to the above method embodiments can be performed.

The embodiment of the present disclosure also provides a non-transitory computer-readable storage medium which stores computer-executable instructions for performing any one of the resource configuration methods according to the above embodiments.

In summary, the technical solution of the present disclosure proposes PRACH time-frequency resource configurations, the formats of random access preamble sequences, and related signaling indications applicable to an LAA TDD system, thereby meeting the dynamic uplink/downlink changing frame structure of the LAA TDD and the LBT mechanism, which includes:

First, as for the formats of the random access preamble sequences, the format used in the LAA system is a subset of five conventional formats. The selection priority of the five conventional formats is as follows:

format 4>format 0>format 2>=format 1>format 3.

In the above five types of formats, since in the format 4, the time length for occupation of the random access channel by the terminal is shortest, and coverage area is smallest and is about 2.1 km, the format 4 is completely suitable for a small cell, so that the signal detection mode corresponding to the format 4 has the highest priority; in the format 0, the time length for occupation of the random access channel by the terminal is approximately 1 ms; in the format 2 and the format 1, the time length for occupation of the random access channel by the terminal is approximately 2 ms; and in the format 3, the time length for occupation of the random access channel by the terminal is approximately 3 ms.

In different formats, the priority of the channel detection mode corresponding to a format represents the ranking order of the format to be selected by the LAA. The higher priority corresponding to a format means that the LAA system more tends to select the format. In addition, the priority also represents a difficulty level for occupation of the PRACH by the terminal and/or a time length for occupation of the PRACH by the terminal. The higher priority of the channel detection mode corresponding to a certain format represents the easier occupation of the PRACH by the terminal and/or the shorter time length for occupation of the PRACH by the terminal.

On the basis of the above defined priorities, if the LAA system uses one of the formats of the random access preamble sequences, a set {format 4} or a set {format 0} can be selected; if two are used, a set {format 4, format 0} can be selected; if three are used, a set {format 4, format 0, format 2} or a set {format 4, format 0, format 1} can be selected; if four are used, a set {format 4, format 0, format 2, format 1} can be selected; and if five are used, a set {format 4, format 0, format 2, format 1, format 3} can be selected.

Second, a problem on a resource configuration of the six Resource Blocks (RBs) occupied by the PRACH may have the following choices:

1. Continuous six RBs are occupied, and are located between a Physical Uplink Control Channel (PUCCH) and a Physical Uplink Shared Channel (PUSCH);

2. The six RBs are evenly and discontinuously distributed over a bandwidth of the entire LTE system to meet the requirement of occupying more than 80% of the bandwidth.

Third, as for PRACH frequency domain resources, since there are fewer uplink subframes, it is proposed that there are six frequency domain resource blocks for any one of the uplink subframes or the UpPTSs. That is, in each uplink subframe or UpPTS, the LAA bandwidth may have 6×6 RBs for the PRACH.

Fourth, the LBT mechanism of the PRACH:

The first type: no channel detection is required, data is directly transmitted, and the maximum time length for occupation of the channel is 1 ms. It is applicable to channel access for higher PRACH priority, such as the format 0 and/or the format 4 of the random access preamble sequences. For the format 4, the maximum time length for occupation of the channel can also be 2 symbol lengths.

The second type: the channel detection time length is 16 us+M×9 us, and M is 1 or 2. If the channel is detected to be idle, the channel is occupied and the maximum time length for occupation of the channel is 1 ms. It is applicable to channel access for higher PRACH priority, such as the format 0 and/or the format 4 of the random access preamble sequences.

The third type: load-based category 4 LBT mechanism

Parameter 1 is used for the channel detection. The parameter 1 is: the minimum value of a contention window is 3 and the maximum value thereof is 7; a value of the extended period is 16 us+M×9 us, and M is 1 or 2; and the maximum time length for occupation of the channel is 2 ms. It is applicable to channel access for a third-ranked PRACH priority, such as the format 1 and the format 2 of the random access preamble sequences.

Or, parameter 2 is used for the channel detection. The parameter 2 is: the minimum value of the contention window is 7 and the maximum value thereof is 15; the value of the extended period is 16 us+M×9 us, and M is 1 or 2, and the maximum time length for occupation of the channel is 3 ms. It is applicable to the channel access for a fourth-ranked PRACH priority, such as the format 3 of the random access preamble sequence.

Fifth, PRACH time-frequency resource configuration signaling:

The base station uses a RRC signaling or a DCI signaling for configuration, which includes:

Method 1: the frequency domain resources and the time domain resources are separately indicated. For example, the frequency domain resources can be indicated by the RRC signaling, while the time domain resources are indicated by the DCI signaling because the uplink subframe is dynamically allocated. Optionally, only the first subframe of the PRACH resources is indicated by the uplink subframe resources indicated by the DCI signaling. It should be understood that in the embodiment of the present disclosure, the first subframe of the PRACH resources in the embodiment of the present disclosure is the uplink subframe or the UpPTS, for example, multiple subframes may be occupied for some formats of the random access preamble sequences, but only the position of the first subframe is indicated in the embodiment of the present disclosure.

Method 2: The frequency domain resources are indicated together with the time domain resources. Optionally, indications are made using the DCI signaling. When the DCI signaling indicates the uplink subframe, only the position of the first subframe is also indicated.

The following describes how the DCI signaling indicates the position of the uplink subframe for the PRACH, which is applicable to the above method 1 and method 2:

1. For the TDD mode with the dynamic uplink/downlink subframe configuration, the present disclosure proposes that the number of continuous downlink subframes is a maximum of 10 subframes.

2. If the current subframe is the subframe n, the DCI signaling needs to indicate that the subframe n+m is the first subframe of the uplink PRACH resources, where m is a positive integer less than or equal to 10, and therefore, 4 bits of the DCI signaling are required to indicate. When the DCI signaling is 3 bits, the indication may be started at 8 subframes before the first subframe of the PRACH resources; or when the DCI signaling is 2 bits, the indication is started at 4 subframes before the first subframe of the PRACH resources; or when the DCI signaling is 1 bit, the indication is started at 2 subframes before the first subframe of the PRACH resources. When the DCI signaling is 1 bit, it may indicate in one subframe before the first subframe of the PRACH resources whether the next subframe is the first subframe of the PRACH.

Exemplarily, the DCI signaling shown in Table 2 is 4 bits, and then the indication is started at the first 10 subframes of the PRACH resources; the DCI signaling shown in Table 3 is 1 bit, then the indication is started at the first two subframes before the first subframe of the PRACH resources; the DCI signaling shown in Table 4 is 1 bit, it is indicated whether the next subframe is the first subframe of the PARCH resources.

The indication is started from x subframes before the first subframe of the PRACH resources, representing that the first subframe of the PRACH resources is the subframe n+x, and then the downlink subframes in the subframes before the subframe n+x: subframe n, subframe n+1, subframe n+2, . . . , subframe n+x−1 all give such the DCI indications, and these x DCI indications all means that: the subframe n+x is the first subframe of the PRACH resources.

TABLE 2

| DCI bit sequence | CCA starting point configuration |
|---|---|
| 0000 | The current subframe is n, and the n + 1-th subframe is the first subframe of the PRACH resources |
| 0001 | The current subframe is n, and the n + 2-th subframe is the first subframe of the PRACH resources |
| 0010 | The current subframe is n, and the n + 3-th subframe is the first subframe of the PRACH resources |
| 0011 | The current subframe is n, and the n + 4-th subframe is the first subframe of the PRACH resources |
| 0100 | The current subframe is n, and the n + 5-th subframe is the first subframe of the PRACH resources |
| 0101 | The current subframe is n, and the n + 6-th subframe is the first subframe of the PRACH resources |
| 0110 | The current subframe is n, and the n + 7-th subframe is the first subframe of the PRACH resources |
| 0111 | The current subframe is n, and the n + 8-th subframe is the first subframe of the PRACH resources |
| 1000 | The current subframe is n, and the n + 9-th subframe is the first subframe of the PRACH resources |
| 1001 | The current subframe is n, and the n + 10-th subframe is the first subframe of the PRACH resources |
| 1010 | Reserved |
| 1011 | Reserved |
| 1100 | Reserved |
| 1101 | Reserved |
| 1110 | Reserved |
| 1111 | Reserved |

TABLE 3

| DCI bit sequence | CCA starting point configuration |
|---|---|
| 0 | The current subframe is n, and the n + 1-th subframe is the first subframe of the PRACH resources |
| 1 | The current subframe is n, and the n + 2-th subframe is the first subframe of the PRACH resources |

TABLE 4

| DCI bit sequence | CCA starting point configuration |
|---|---|
| 0 | The next subframe is not the first subframe of the PRACH resources |
| 1 | The next subframe is the first subframe of the PRACH resources |

3. The first DCI signaling transmits, to the terminal, information for indicating all the uplink subframes or the UpPTSs within a predetermined time domain range, and the second DCI signaling indicates, to the terminal, the uplink subframes or the UpPTSs for PRACH in all the uplink subframes or UpPTSs. For example, if the first DCI signaling transmits, to the terminal, an indication that continuous M subframes are uplink subframes or UpPTSs within a predetermined time domain range, then the second DCI signaling indicates to the terminal which one of the above continuous M subframes is used to transmit the first subframe of the PRACH resources, for example, indicate that one of the above continuous M subframes is the first subframe of the PRACH resources.

4. The DCI signaling may be transmitted on the licensed spectrum or on the unlicensed spectrum.

5. The DCI signaling may be transmitted to a specified user separately, or all users may be indicated using the DCI signaling of the PDCCH common search space.

6. All users need to monitor the DCI signaling used to indicate the position of the uplink PRACH subframe so as to obtain the position of the PRACH subframe.

The foregoing technical solution of the present disclosure provides PRACH time-frequency resources, the formats of the random access preamble sequences, and corresponding signaling indications configured for the TDD with dynamic uplink/downlink changes, and proposes the PRACH time-frequency resources, the formats of the random access preamble sequences, and the corresponding signaling indications that are more suitable for dynamic changes of LAA TDD frame structures, so that it enables the LAA TDD to achieve more random accesses with minimum uplink subframes or UpPTSs, and reduce random access delay.

The technical solutions of the present disclosure are described in detail above with reference to the accompanying drawings. The present disclosure proposes a resource configuration scheme in the case where the LTE system operates on the unlicensed frequency band in the TDD mode with the dynamic uplink/downlink mode, in which the time-frequency resources occupied by the PRACH may be reasonably configured, so as to ensure that the LTE system, when operating on the unlicensed frequency band in the TDD mode with the dynamic uplink/downlink mode, can achieve more random accesses in the case of fewer uplink subframes or UpPTSs.

The foregoing descriptions are merely exemplary embodiments of the present disclosure and are not intended to limit the disclosure. For those skilled in the art, the disclosure may have various changes and modifications. Any modification, equivalent replacement, or improvement made within the spirit and principle of the present disclosure shall fall within the protection scope of the present disclosure.

INDUSTRIAL APPLICABILITY

The technical solution of the present disclosure can reasonably configure the time-frequency resources occupied by the PRACH, so as to ensure that the LTE system can achieve more random accesses in the case of fewer uplink subframes or UpPTSs when operates on the unlicensed frequency band in the TDD mode with the dynamic uplink/downlink mode.

What is claimed is:

1. A resource configuration method, comprising:
    transmitting, to a terminal, indication information used to indicate time-frequency resources occupied by a Physical Random Access Channel (PRACH), so as to enable the terminal to initiate a random access process through corresponding time-frequency resources, wherein, the method is applied when a Long Term Evolution (LTE) system operates on an unlicensed frequency band in a Time Division Duplexing (TDD) mode with a dynamic uplink/downlink configuration, and the indication information, when indicating time domain resources occupied by the PRACH, indicates only a position of a first subframe occupied by the PRACH, wherein the first subframe is an uplink subframe or an Uplink Pilot Timeslot (UpPTS).

2. The method according to claim 1, wherein transmitting to the terminal the indication information used to indicate the time-frequency resources occupied by the PRACH comprises:
    transmitting, to the terminal through a Radio Resource Control (RRC) signaling, indication information used to indicate frequency domain resources occupied by the PRACH, and
    transmitting, to the terminal through a downlink control information (DCI) signaling, instruction information used to indicate the time domain resources occupied by the PRACH; or
    transmitting, to the terminal through the DCI signaling, indication information used to indicate the time domain resources and the frequency domain resources occupied by the PRACH.

3. The method according to claim 2, wherein transmitting to the terminal through the DCI signaling the indication information used to indicate the time domain resources occupied by the PRACH comprises:
    transmitting, to the terminal through a first DCI signaling, information used to indicate all the uplink subframes and/or the UpPTSs within a predetermined time domain range; and
    transmitting, to the terminal through a second DCI signaling, information used to indicate a position of the first subframe occupied by the PRACH in the all the uplink subframes and/or the UpPTSs.

4. The method according to claim 1, wherein transmitting to the terminal the indication information used to indicate the time-frequency resources occupied by the PRACH comprises:
    transmitting, to the terminal in a downlink subframe n, the indication information to indicate to the terminal that a subframe n+m is the first subframe occupied by the PRACH, wherein m is a positive integer less than or equal to 10 ; and the resource configuration method further comprises:
determining the number of bits occupied by the indication information according to value of m.

5. The method according to claim 4, further comprising: transmitting again, if the indication information is transmitted to the terminal in the downlink subframe n, the indication information to the terminal in each downlink subframe after the downlink subframe n and before the subframe n+m.

6. The method according to claim 1, wherein the indication information is transmitted to the terminal on a licensed frequency band or the unlicensed frequency band.

7. The method according to claim 1, further comprising: transmitting, to all the terminals, the indication information at one time by using the DCI signaling in a common search space, or
transmitting, to a specified terminal only, the indication information at one time by using the DCI signaling of a UE-specific search space.

8. The method according to claim 1, further comprising: configuring a format of a random access preamble sequence to the terminal,
wherein when configuring the format of the random access preamble sequence to the terminal, a format is selected from a set of the formats of the random access preamble sequences, and then the selected format of the random access preamble sequence is configured to the terminal.

9. The method according to claim 8, wherein the set of the formats of the random access preamble sequences satisfies the following condition:
containing one format, which is a format 0 or a format 4 of the random access preamble sequence;
containing two formats, which are the format 0 and the format 4 of the random access preamble sequence;
containing three formats, which are: the format 0, the format 4 and a format 1 of the random access preamble sequence, or the format 0, the format 4 and a format 2 of the random access preamble sequence;
containing four formats, which are the format 0, the format 4, the format 1 and the format 2 of the random access preamble sequence; or
containing five formats, which are the format 0, the format 4, the format 1, the format 2 and a format 3 of the random access preamble sequence.

10. The method according to claim 1, further comprising: six frequency domain resource blocks occupied by each of the PRACHs are evenly and discontinuously distributed over a bandwidth of the LTE system; or
the six frequency domain resource blocks occupied by each of the PRACHs are continuously distributed over a bandwidth of the LTE system.

11. A resource configuration device, comprising:
a transmitting unit, configured to transmit indication information used to indicate time-frequency resources occupied by a Physical Random Access Channel (PRACH) to a terminal, so as to enable the terminal to initiate a random access process through corresponding time-frequency resources, wherein, the device is applied to when a Long Term Evolution (LTE) system operates on an unlicensed frequency band in a Time Division Duplexing (TDD) mode with a dynamic uplink/downlink configuration, and the indication information, when indicating time domain resources occupied by the PRACH, indicates only a position of a first subframe occupied by the PRACH, wherein the first subframe is an uplink subframe or an Uplink Pilot Timeslot (UpPTS).

12. The device according to claim 11, wherein the transmitting unit is configured to:
transmitting, to the terminal through a Radio Resource Control (RRC) signaling, indication information used to indicate frequency domain resources occupied by the PRACH, and transmitting, to the terminal through a downlink control information (DCI) signaling, indication information used to indicate the time domain resources occupied by the PRACH; or
transmitting, to the terminal through the DCI signaling, indication information used to indicate the time domain resources and the frequency domain resources occupied by the PRACH.

13. The device according to claim 12, wherein, transmitting to the terminal through the DCI signaling the indication information used to indicate the time domain resources occupied by the PRACH comprises:
transmitting, to the terminal through a first DCI signaling, information used to indicate all the uplink subframes and/or the UpPTSs within a predetermined time domain range; and
transmitting, to the terminal through a second DCI signaling, information used to indicate a position of the first subframe occupied by the PRACH in the all the uplink subframes and/or the UpPTSs.

14. The device according to claim 11, wherein the transmitting unit is configured to:
transmitting, to the terminal in a downlink subframe n, the indication information to indicate to the terminal that a subframe n+m is the first subframe occupied by the PRACH, wherein m is a positive integer less than or equal to 10 ; and
the resource configuration device further comprises:
a determining unit, configured to determine the number of bits occupied by the indication information according to value of m.

15. The device according to claim 14, wherein the transmitting unit is configured to:
transmitting again, if the indication information is transmitted to the terminal in the downlink subframe n, the indication information to the terminal in each downlink subframe after the downlink subframe n and before the subframe n+m.

16. The device according to claim 11, wherein the transmitting unit is configured to:
transmitting, to the terminal, the indication information on a licensed frequency band or the unlicensed frequency band.

17. The device according to claim 11, wherein the transmitting unit is configured to:
transmitting, to all the terminals, the indication information at one time by using the DCI signaling in a common search space, or
transmitting, to one specified terminal only, the indication information at one time by using the DCI signaling of a UE-specific search space.

18. The device according to claim 11, further comprising:
an configuration unit, configured to configure a format of a random access preamble sequence to the terminal, wherein, when configuring the format of the random access preamble sequence to the terminal, the configuration unit selects a format from a set of the formats of the random access preamble sequences, and configures the selected format of the random access preamble sequence to the terminal.

19. The device according to claim 18, wherein the set of the formats of the random access preamble sequences satisfies the following condition:

containing one format, which is a format 0 or a format 4 of the random access preamble sequence;

containing two formats, which are the format 0 and the format 4 of the random access preamble sequence;

containing three formats, which are: the format 0, the format 4 and a format 1 of the random access preamble sequence, or the format 0, the format 4 and a format 2 of the random access preamble sequence;

containing four formats, which are the format 0, the format 4, the format 1 and the format 2 of the random access preamble sequence; or containing five formats, which are the format 0, the format 4, the format 1, the format 2 and a format 3 of the random access preamble sequence.

20. A base station, comprising:

a resource configuration device when an LTE system operates on an unlicensed frequency band in a TDD mode with a dynamic uplink/downlink mode according to claim 1.

* * * * *